May 7, 1940.                          Z. ISHIWATA                          2,199,883
           APPARATUS FOR PREVENTING RAISING OF DUST
              AND SPLASHING OF MUD BY AUTOMOBILES
                    Filed March 17, 1938              2 Sheets-Sheet 1

Inventor
Zenzo Ishiwata
By E. F. Wenderoth
Attorney

May 7, 1940.　　　　Z. ISHIWATA　　　　2,199,883
APPARATUS FOR PREVENTING RAISING OF DUST
AND SPLASHING OF MUD BY AUTOMOBILES
Filed March 17, 1938　　　2 Sheets-Sheet 2

Inventor
Zenzo Ishiwata
By C. F. Wendiroth
Attorney

Patented May 7, 1940

2,199,883

UNITED STATES PATENT OFFICE 2,199,883

APPARATUS FOR PREVENTING RAISING OF DUST AND SPLASHING OF MUD BY AUTOMOBILES

Zenzo Ishiwata, Seta-gun, Gunma-ken, Japan

Application March 17, 1938, Serial No. 196,506

4 Claims. (Cl. 180—84)

This invention relates to an arrangement whereby the rising of dust and the splashing of mud at the rear of an automobile is counteracted and prevented.

It is an object of the invention to provide a construction for use with automobiles which will supply air to the locations at the back of an automobile where a vacuum or partial vacuum is caused by the travel of the automobile.

It is a further object of the invention to provide means whereby the air supplying mechanism is actuated by the driving mechanism of the automobile so that the supply of air is automatically proportioned to the speed of the automobile.

A still further object of the invention is to provide an inclined plate mounted upon the automobile which will direct air to the back of the automobile.

With the above and other objects in view, which will become apparent from the detailed description below, the invention is shown in the drawings in which.

Figure 1:
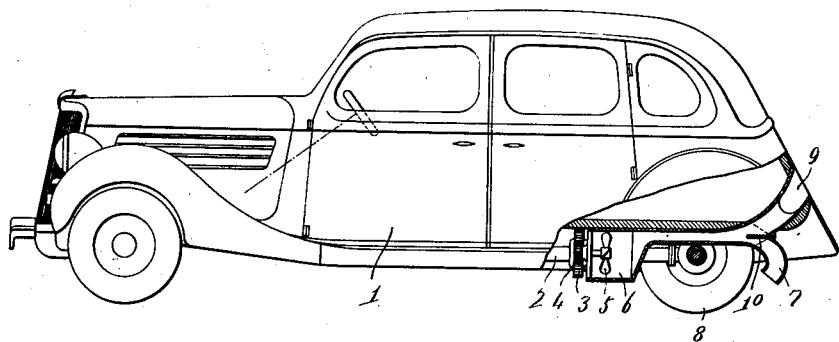
Fig. 1 is a side elevation of an automobile with parts cut away showing one form of the invention.
Figure 4:
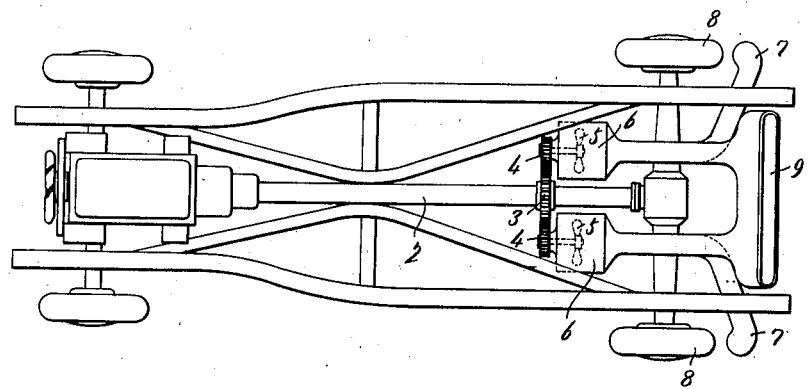
Fig. 4 is a plan view of the chassis of an automobile showing the modification illustrated in Fig. 1.

Referring to the drawings in which similar reference characters are used for like parts throughout the various views, I indicates the body of an automobile which, as shown in Fig. 4 is provided with a driving shaft 2 provided with a gear 3, meshing with the gears 4 positioned laterally of the driving shaft 2. The gears 4 are connected to the shafts of the fans 5 located in the boxes 6. Extending rearwardly from the boxes 6 are the conduits 7 which also communicate with the duct 9. The boxes 6 may be provided with any desired type of openings to the atmosphere so as to provide a supply of air thereto. The conduits 7 are turned downwardly as shown so as to direct the air supplied by the fans 5 towards the back of the tires 8. The duct 9 directs the air to the back of the body I as shown particularly in Figure 1.

In order to control the proportion of air which is supplied in back of the tires 8 or to the back of the body I, a regulating valve 10 is provided at the junctures between the duct 9 and the conduit 7.

From the construction described, it is obvious that the amount of air supplied to the conduit 7 and the duct 9 will be proportional to the rotating speed of the drive shaft 2 and therefore proportional to the speed of the automobile.

Figure 2:
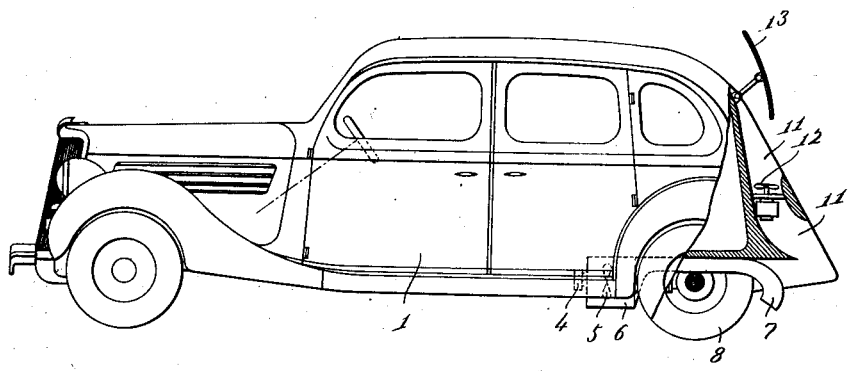
Fig. 2 is a similar view of an automobile showing a modified construction.

In Figure 2 a modification is shown in which an air passage 11 is provided at the rear of the automobile body I and this passage extends vertically so that the lower opening thereof is directed downwardly towards the road while the upper opening is directed upwardly from the road. A fan 12 may be arranged in the passage 11 to direct air towards the lower opening. In addition, a plate 13 which is inclined in the direction in which the automobile travels may be positioned over the upper opening of the passage 11 and projecting over the top of the automobile so as to direct air towards the upper opening of the passage 11 when the automobile is in motion.

Figure 3:
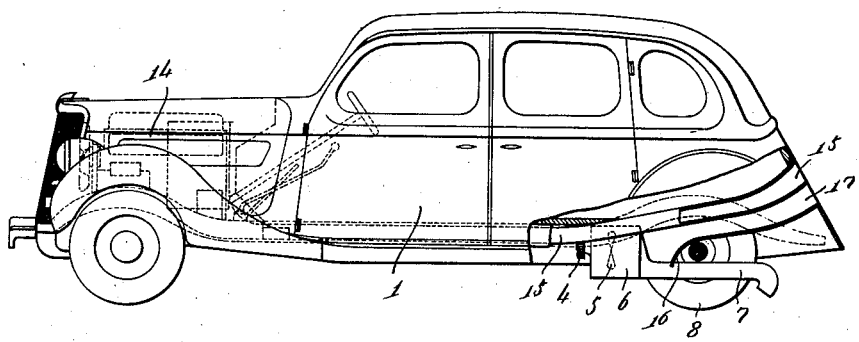
Fig. 3 is a similar view to Fig. 1 illustrating a still further modified construction.

In Figure 3 a further modification is illustrated in which a conduit pipe 15 is provided which extends forwardly to the engine compartment 14 at the front of the automobile and terminates at the rear of the automobile. In this manner air from the engine compartment may be automatically sent to the back of the automobile and a fan may be utilized in order to accelerate the same. Furthermore, an inclined plate 16 may be provided at the lower part of the chassis against which air, when the automobile is in motion, may come in contact and be directed to the back of the automobile through the conduit 17 thereby counteracting the formation of a vacuum at the back of the automobile body. Furthermore, by directing the air to the back of the body I air interchange in the engine compartment 14 is promoted and such compartment is effectively cooled.

It is obvious that various modifications may be made in the structures above described and it is intended that all such modifications are claimed as will fall within the scope of the following claims.

Having now described my invention what I claim is:

1. In an automobile, the combination of a drive shaft, an air chamber, an air duct leading from said air chamber to the rear of the automobile, a fan blowing the air in said air chamber through said air duct, means on said drive shaft for rotating said fan and means for supplying air to the back of said automobile to counteract the formation of a vacuum.

2. In an automobile, a drive shaft, an air chamber, an air duct leading from said chamber to the rear of the automobile, a fan blowing the air from said air chamber through said air duct towards the rear of the automobile, means on said drive shaft for rotating said fan, a second air duct located at the rear of said automobile and extending vertically and a slanting plate mounted on the outside of said automobile above the upper outlet of said second air duct to direct air when the automobile is in motion to said second air duct.

3. In an automobile, a drive shaft, an air chamber, a plurality of air ducts connected to said air chamber, one of said air ducts leading to a point located in back of a rear tire of the automobile, another of said air ducts leading to the rear of the automobile body, a fan located in said air chamber for blowing the air through said ducts and means controlling the amount of air supplied to the various ducts.

4. In an automobile, a drive shaft, an air chamber, a plurality of air ducts connected to said air chamber, one of said air ducts leading to a point located in back of a rear tire of the automobile, another of said air ducts leading to the rear of the automobile body, a fan located in said air chamber for blowing the air through said ducts and a regulating valve controlling the amount of air directed through the various ducts.

ZENZO ISHIWATA.